(12) United States Patent
Carlinsky et al.

(10) Patent No.: US 9,238,920 B1
(45) Date of Patent: Jan. 19, 2016

(54) LIFTABLE STRUCTURE SYSTEM

(71) Applicants: Herman Carlinsky, Woodbury, NY (US); Anthony L. Cioffi, Cortlandt Manor, NY (US); Paul Pellicani, Glen Cove, NY (US)

(72) Inventors: Herman Carlinsky, Woodbury, NY (US); Anthony L. Cioffi, Cortlandt Manor, NY (US); Paul Pellicani, Glen Cove, NY (US)

(73) Assignee: FLOOD LIFT SYSTEM CORPORATION, Garden City, NY (US)

( * ) Notice: Subject to any disclaimer, the term of this patent is extended or adjusted under 35 U.S.C. 154(b) by 0 days.

(21) Appl. No.: 14/215,865

(22) Filed: Mar. 17, 2014

Related U.S. Application Data

(60) Provisional application No. 61/790,506, filed on Mar. 15, 2013.

(51) Int. Cl.
*E02D 35/00* (2006.01)
*E04H 9/14* (2006.01)
*E04B 1/343* (2006.01)

(52) U.S. Cl.
CPC ............ *E04H 9/145* (2013.01); *E04B 1/34336* (2013.01)

(58) Field of Classification Search
CPC .............................. E02D 35/00; E04H 9/145
USPC ........ 52/125.1, 126.1, 126.5, 169.9; 405/229, 405/230, 233, 247, 331
See application file for complete search history.

(56) References Cited

U.S. PATENT DOCUMENTS

| | | | | |
|---|---|---|---|---|
| 2,715,756 | A * | 8/1955 | Carver | 405/229 |
| 3,796,055 | A * | 3/1974 | Mahony | 405/230 |
| 4,938,634 | A * | 7/1990 | Lee | 405/229 |
| 5,013,190 | A * | 5/1991 | Green | 405/230 |
| 5,110,250 | A * | 5/1992 | Kuo | 414/229 |
| 5,647,693 | A | 7/1997 | Carlinsky et al. | |
| 5,775,847 | A | 7/1998 | Carlinsky et al. | |
| 5,904,446 | A * | 5/1999 | Carlinsky et al. | 405/229 |
| 6,193,442 | B1 * | 2/2001 | May | 405/232 |
| 6,347,487 | B1 * | 2/2002 | Davis | 52/1 |
| 6,379,085 | B1 * | 4/2002 | Vanderklaauw | 405/230 |
| 6,467,231 | B1 | 10/2002 | Carlinsky et al. | |
| 6,684,577 | B2 | 2/2004 | Dimitrijevic | |
| 6,814,524 | B1 | 11/2004 | Peterson | |
| 6,923,599 | B2 * | 8/2005 | Kelso | 405/230 |
| 7,073,296 | B2 | 7/2006 | Gregory et al. | |
| 7,347,476 | B2 * | 3/2008 | Luehr et al. | 296/61 |

(Continued)

*Primary Examiner* — Basil Katcheves
*Assistant Examiner* — Joshua Ihezie
(74) *Attorney, Agent, or Firm* — Sorell, Lenna & Schmidt, LLP; Leo G. Lenna

(57) ABSTRACT

A liftable building system includes a building structure. A foundation is configured for supporting the building structure. A substructure is disposable between the foundation and the building structure. At least one guide post is in communication with the building structure, the substructure and the foundation. The liftable building system includes a lifting system including a first end and a second end. The first end is in communication with the substructure and the second end is in communication with the foundation so that actuating the lifting system applies a force to axially displace in a substantially up and down direction the substructure with the building structure along or with the at least one guidepost relative to the foundation.

19 Claims, 21 Drawing Sheets

(56) References Cited

U.S. PATENT DOCUMENTS

| | | |
|---|---|---|
| 7,967,531 B2 | 6/2011 | Collina et al. |
| 2002/0184834 A1 | 12/2002 | Dimitrijevic |
| 2004/0037653 A1* | 2/2004 | Kelso ............................ 405/236 |
| 2004/0262949 A1* | 12/2004 | Rasmussen ................... 296/158 |
| 2007/0137944 A1* | 6/2007 | Lam .............................. 187/267 |
| 2007/0166110 A1* | 7/2007 | Kenady ......................... 405/224 |
| 2008/0175673 A1* | 7/2008 | Roberts et al. ................ 405/230 |
| 2012/0114423 A1* | 5/2012 | Zago et al. .................... 405/230 |

* cited by examiner

LIFTABLE STRUCTURE SYSTEM

TECHNICAL FIELD

The present disclosure relates to a liftable building system for buildings susceptible to flood conditions. In particular, the disclosure relates to a building having a liftable foundation that may be lifted upon activation of a mechanical lifting system to avoid flooding of habitable spaces of the liftable structure.

BACKGROUND

Real estate near beaches or waterways has a special allure both for residential and commercial purposes. Waterfront property or property located near water is often in high demand for its aesthetic beauty and its many uses from recreation to farming. For example, a large tourist and recreation industry is often built near waterways. In addition, proximity to waterways provides many other advantages, such as convenient shipping and transportation.

The natural beauty and the many uses of water resulted in constructing commercial and residential buildings near waterfronts. This trend shows no sign of slowing especially as the population grows and every piece of real estate is considered for development. However, real estate near waterways and low lying areas are prone to flooding which displaces people and disrupts businesses as the buildings become uninhabitable and suffer internal damage.

The present disclosure eliminates the need to build building structures on elevated foundations in flood prone areas and provides for a desirable basement/crawl space without the fear of flooding the first floor or habitable spaces of the building structure. Further, the liftable building system of the present disclosure does not rely upon rising floodwater; it may be lifted off of its permanent foundation upon activation of, for example, a mechanical lifting system.

SUMMARY

The present disclosure achieves these and other objects by providing, in one embodiment, a liftable building system, comprising a building structure. A foundation is configured for supporting the building structure. A substructure is disposable between the foundation and the building structure. At least one guide post is in communication with the building structure, the substructure and the foundation. A lifting system extends between a first end and a second end. The first end is in communication with the substructure and the second end is in communication with the foundation so that actuating the lifting system applies a force to axially displace in a substantially up and down direction the substructure with the building structure along or with the at least one guide post relative to the foundation.

In one embodiment, the liftable building system comprises a building structure. A ramp extends between a first end fixedly engagable with a support element and a second end detachably engagable with the support element. The support element is adjacent to the building structure. A foundation is configured for supporting the building structure. A substructure is disposable between the foundation and the building structure. At least one guide post is in communication with the building structure, the substructure and the foundation. A lifting system extends between a first end and a second end. The first end is in communication with the substructure and the second end is in communication with the foundation so that actuating the lifting system applies a force to axially displace in a substantially up and down direction the substructure with the building structure along or with the at least one guide post relative to the foundation.

In one embodiment, the liftable building system comprises a house. A foundation is configured for supporting the house comprising a concrete wall footing disposable with ground, a concrete wall siding surrounding a perimeter of the house and being in substantially perpendicular engagement with the concrete wall footing, and a concrete slab disposable with the concrete wall footing. A steel structural support frame has an upper surface coupled to the house and a lower surface disposable with the concrete wall siding. A plurality of guide posts are disposable with the building structure, the foundation and the support frame. A lifting system comprises a plurality of linear actuators disposable between the concrete slab and the support frame and horizontal drive shafts coupled to the plurality of linear actuators such that actuating the lifting system causes the linear actuators to apply a force to axially displace in a substantially up and down direction the support frame with the house along or with the plurality of guide posts relative to the foundation creating a gap between the concrete wall siding and the house.

DETAILED DESCRIPTION

Figure 1:
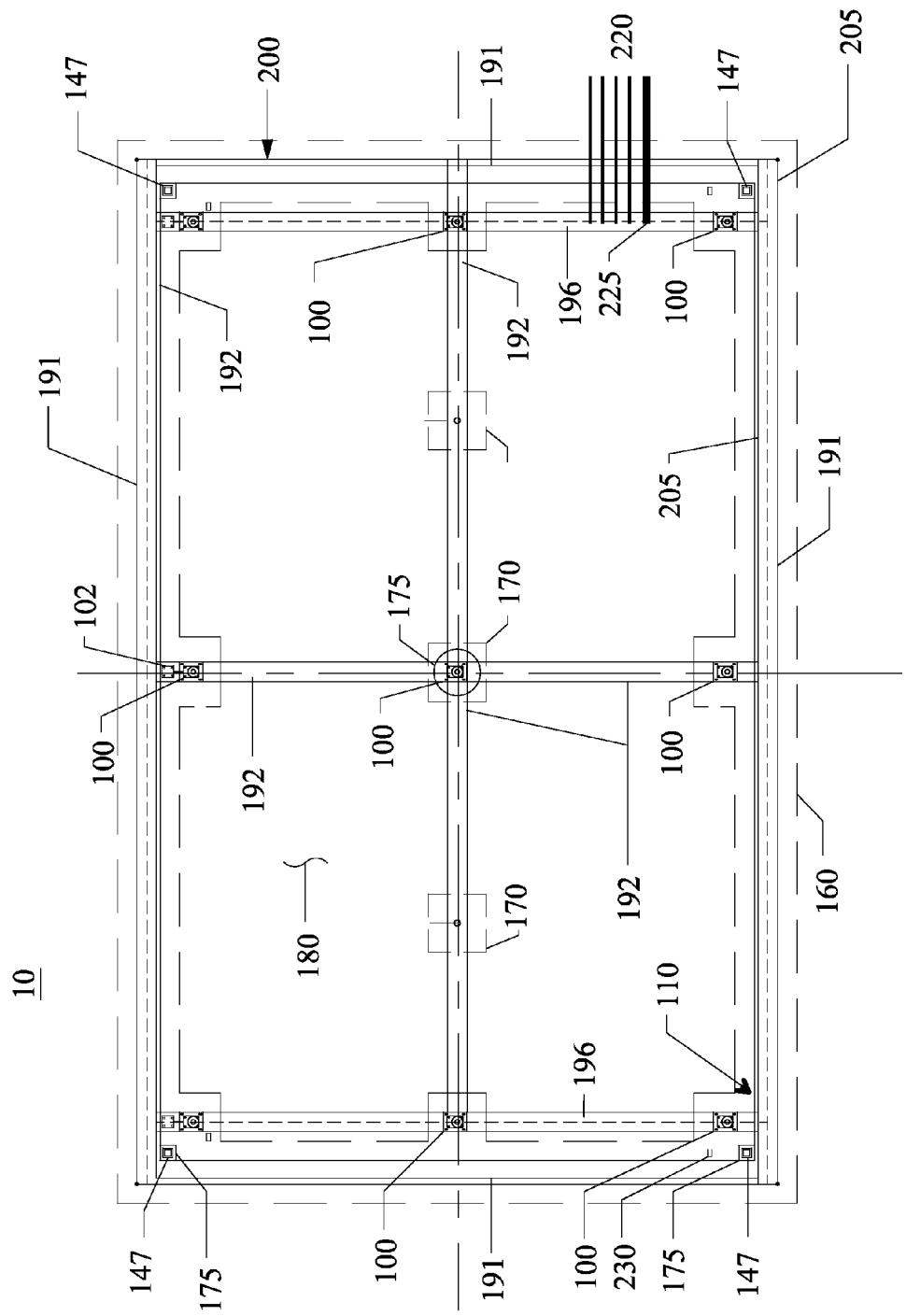
FIG. 1 is a plan view of one embodiment of the liftable building system in accordance with the principles of the present disclosure.

The present disclosure may be understood more readily by reference to the following detailed description of the disclosure presented in connection with the accompanying drawings, which together form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

As used in the specification and including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value.

Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features.

Reference will now be made in detail to certain embodiments of the disclosure, examples of which are illustrated in the accompanying drawings. While the disclosure will be described in conjunction with the illustrated embodiments, it will be understood that they are not intended to limit the disclosure to those embodiments. On the contrary, the disclosure is intended to cover all alternatives, modifications, and equivalents that may be included within the disclosure as defined by the appended claims.

The following discussion includes a description of a liftable building system 10 in accordance with the principles of the present disclosure. Alternate embodiments are also disclosed. Reference will now be made in detail to the exemplary embodiments of the present disclosure, which are illustrated in the accompanying figures. Turning now to FIGS. 1-22, there are illustrated components of the liftable building system 10 in accordance with the principles of the present disclosure.

Figure 12:
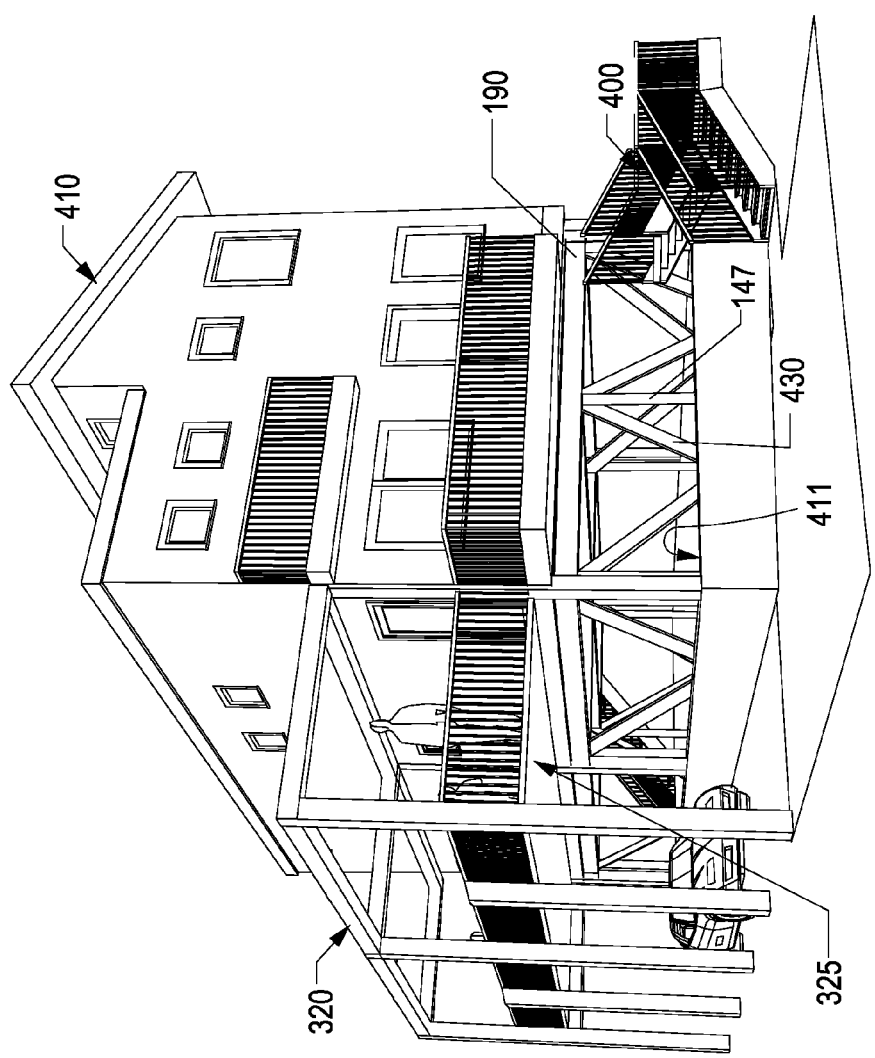
FIG. 12 is a perspective view of components of the system shown in FIG. 12 in a raised position.

According to one embodiment of the present disclosure, system 10 includes a building structure, such as, for example, a house 410 as depicted in FIG. 12. The house 410 may be constructed on site, or may be a prefabricated modular design which is installed on site. The house 410 is installed upon a lift system 110, to be further described below. House 410 may be constructed from a variety of materials or combinations thereof. The materials may be pre-fabricated on-site or off-site, or may consist of site fabricated components. These components include a roof structure system 420, a system of perimeter exterior and interior walls 425, and floor systems 200. Each of these components may be fabricated from various material and methods including site-built wood framing, metal framing, insulated concrete forms (ICF) or off-site prefabricated wood framing panels, wood or steel framed modular sections, metal framing panels, and structural insulated panels (SIPS). The house 410 may be constructed in phases, such that a future expansion of the house 410 shall operate under the same premise of the original embodiment. House 410 further includes a detachable staircase 400 made of wood, metal or any combination of materials described herein. Staircase 400 is detachably engagable with the base of the house 410.

Figure 3:
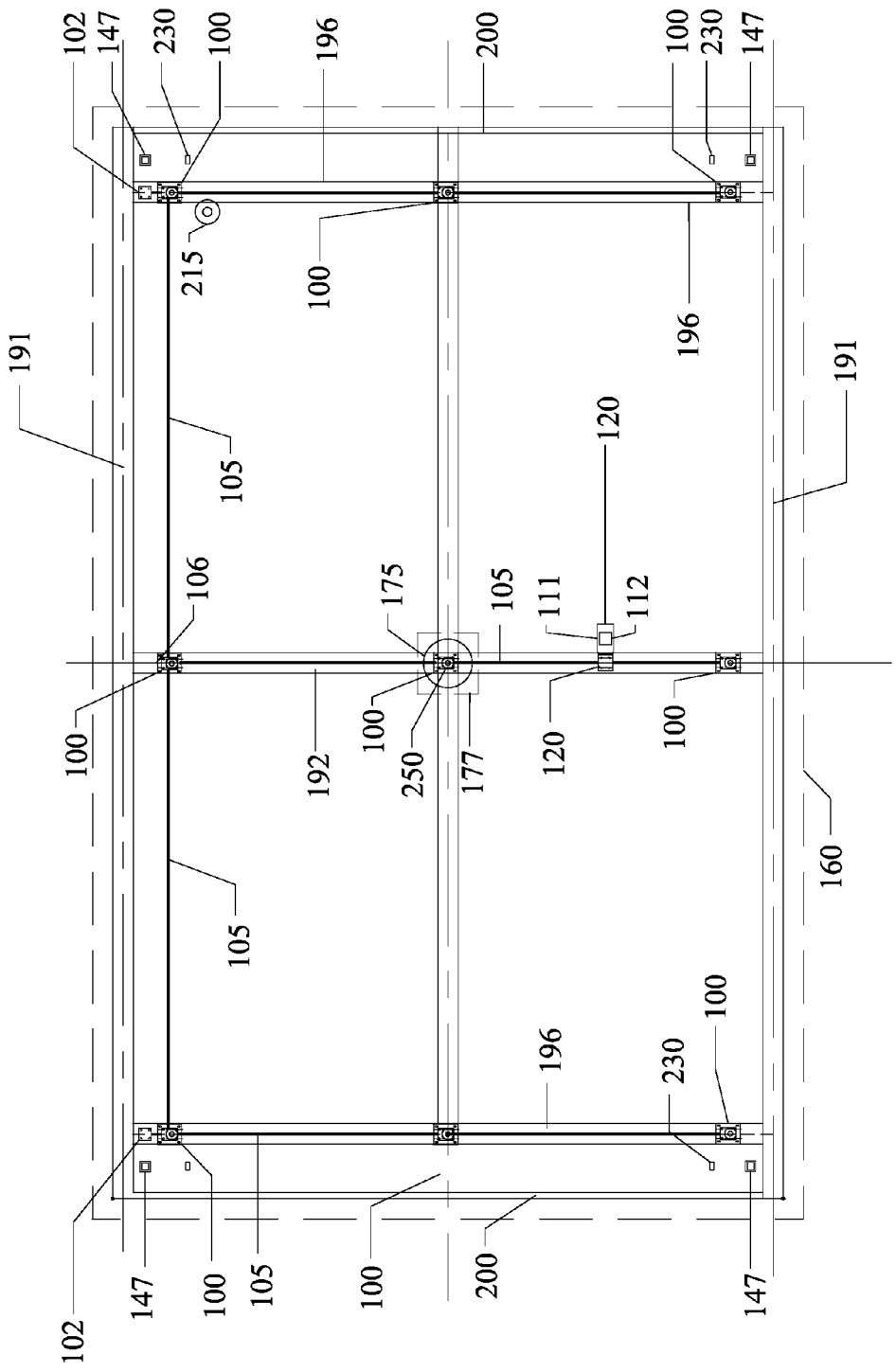
FIG. 3 is a cutaway, plan view, of components of the system shown in FIG. 1.

System 10 includes foundation 101 configured for supporting the house 410. A plurality of lateral support columns 415 extend from foundation 101 and through house 410 to brace house 410. The foundation 101 can be constructed from concrete, steel, stainless steel alloys, titanium alloys, cobalt-chrome alloys and any combination thereof. The foundation 101 includes a concrete wall footing 160 disposable within ground G. The foundation 101 further includes a concrete wall siding 205 in substantially perpendicular engagement with the concrete wall footing 160 so as to create a gap, such as, for example a cavity or crawl space 411 between a substructure 190, to be described below, and the concrete wall footing 160. The crawl space 411 is configured for disposal of a lifting system 110, to be described below. The concrete wall siding 205 surrounds the house 410 to further define crawl space 411 between the house 410 and the wall siding 205. A pump pit with a sump pump 215 is installed within the concrete wall siding 205 such that the crawl space 411 defined by the wall siding 205 may be dewatered after flood waters have receded. In one particular embodiment, pump pit w/sump pump 215 shown in FIG. 3 is installed at a corner of a concrete slab 180, to be described below. The pump pit w/sump pump 215 is connected to an external hose that is used to dewater the crawl space/basement 411 after flood waters have receded.

Foundation 101 further includes a planar surface, such as, for example, concrete slab 180. Concrete slab 180 is disposed in crawl space 411 and on concrete wall footing 160 and/or with ground G. Concrete slab 180 lies flat or horizontally with respect to ground G to provide a flat, weight-bearing surface. Lifting system 110 is disposable between the concrete slab 180 and the substructure 190 such that actuation of the lifting system 110 applies a force on the substructure 190 to axially displace in a substantially up and down direction the substructure 190 with the house 410 along or with at least one guide post 147 relative to the concrete wall siding 205, as will be further described in detail below. It is contemplated that the concrete slab 180 can either be placed on top of the ground G directly below house 410, or embedded within the ground G.

System 10 includes the substructure, such as, for example, a structural support frame 190 disposed between an upper portion 206 of concrete wall siding 205 and house 410. Support frame 190 can be constructed from concrete, steel, wood, composite or any combination of materials described herein. In some embodiments, support frame 190 may be constructed from a variety of materials including structural steel girders, pre-cast or cast-in place concreted girders, prefabricated metal girders, lightweight carbon reinforced concrete girders, open-web bar joists or built-up steel girders.

Support frame 190 includes an upper surface and a lower surface. The upper surface or first part 192 of the structural steel support frame 190 is attached to the building structure 410 with a metal connector 195 and, e.g., steel lag bolts 199 as shown, for example, in FIG. 4. First part 192 of frame 190 is an I or W beam made of steel, concrete, wood or any material described herein. The upper surface is coupled to a floor 200 of house 410 such that as the support frame 190 translates, the house 410 translates with the support frame 190. The lower surface is disposable with upper portion 206 of the concrete wall siding 205. Support frame 190 includes a steel beam below building structure spandrel beam 191.

Figure 9:
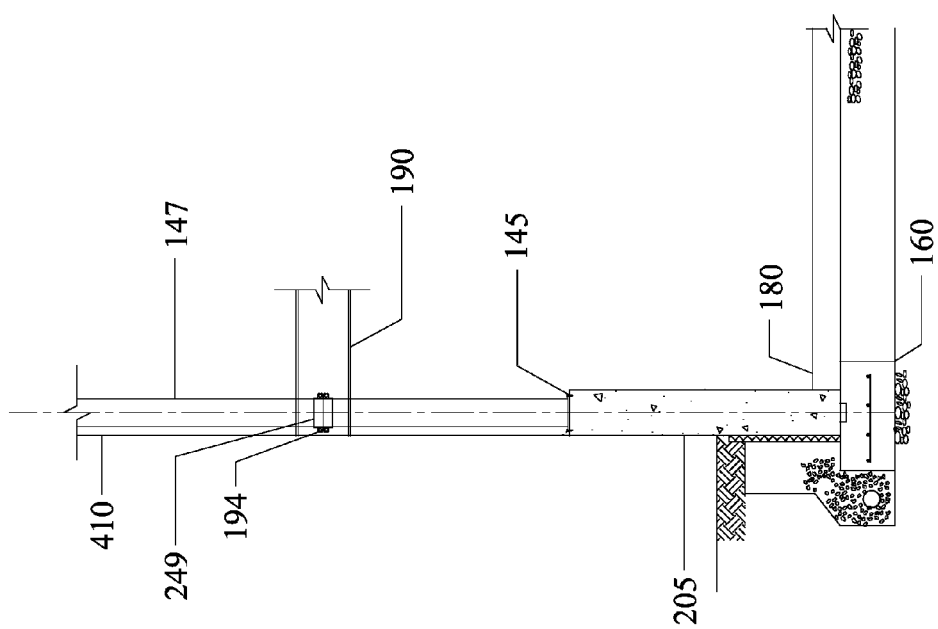
FIG. 9 is an expanded side view, in part cross section, of an alternative embodiment to the system shown in FIG. 8.

In one embodiment, as shown in FIG. 9, support frame 190 further includes at least one collar, such as, for example, a steel collar 249. It is contemplated that the collar 249 is composed of various materials, such as, for example, those materials described herein. A first portion of the collar 249 is fixedly engaged to the support frame 190 via a steel angle 194. A second portion of the collar 249 is slidably coupled to a guidepost 147 such that the support frame 190 is axially translatable along the guidepost 147 relative to the guidepost 147. Steel collar 249 slides along the steel guide post 147 during activation of the linear actuators 100.

In one embodiment, a rubber membrane 210 is in communication with or attached to the structural steel support frame 190 via steel lag bolts. The rubber membrane 210 protects the structural steel support frame 190 during inclement weather by providing a barrier between the finished grade and structural steel support frame 190. The membrane 210 can be constructed from sheets or rolls of rubber, polyurethane, PVC, fiberglass, vinyl, rubberized asphalt, steel, metal or composites.

System 10 includes a plurality of guide posts 147. Guideposts 147 are in communication with the house 410, the support frame 190 and the foundation 101, for example, the foundation wall siding 205 of foundation 101. Guideposts 147 are embedded in the foundation 101 and a concrete pier footing 175 located near the center section and/or corners of the steel support frame 190. Concrete pier footing 175 defines a pocket cast in the permanent foundation wall siding 205 that supports guideposts 147. The guideposts 147 extend 4 feet to 10 feet, 10 feet to 20 feet, 4 feet to 20 feet, or more than 20 feet above the steel support frame 190 and are integral with house 410 so as to provide stability to the house 410 as the house 410 is being raised. Guideposts 147 will be constructed near the center of the support frame 190 and/or at least one corner of the support frame 190.

Figure 8:
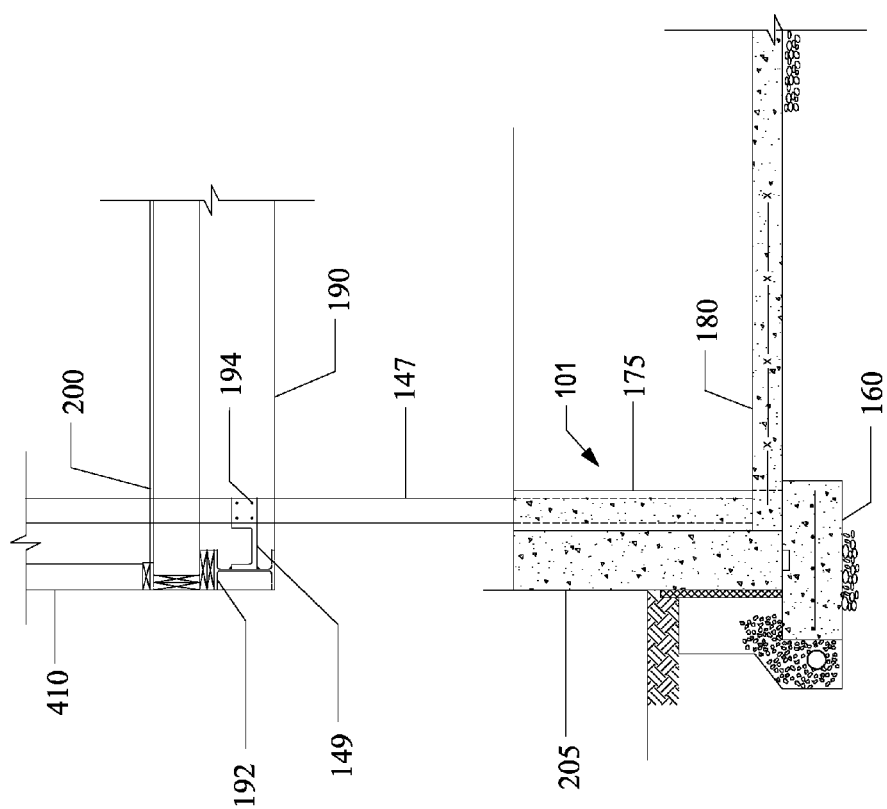
FIG. 8 is an expanded side view, in part cross section, of components of the system shown in FIG. 1.

In one embodiment, as shown in FIG. 8, house 410 is shown in a raised position. The steel guide post 147 is bolted to the steel support frame 190 with a steel angle 194 and are disposed adjacent the four corners of the steel support frame 190. The guide post 147 is connected to the foundation wall siding 205 via a steel base plate (not shown) that is grouted and bolted into the concrete pier footing 175 of foundation wall siding 205. In this particular embodiment, the steel guide post 147 has a telescopic configuration that lengthens during activation of the linear actuators 100 such that support frame 190 axially translates with respect to the foundation 101 as the telescopic guide post 147 is raised. As the support frame 190 axially displaces in an up and down direction, the guidepost 147 expands and contracts with the support frame 190. In this particular embodiment, a lateral steel bracket 149 extends between the concrete slab 180 and the support frame 190 that connects guideposts 147 to support frame 190 via welding or bolting.

Corrosion of the guide post 147 can be prevented through the use of galvanized steel, timber, composites or can be minimized by the application of an epoxy coating. Epoxy coatings can be applied in a factory or on-site. The epoxy coating is a two-component, solvent based coating. The coatings can be sprayed or brushed on.

Figure 4:
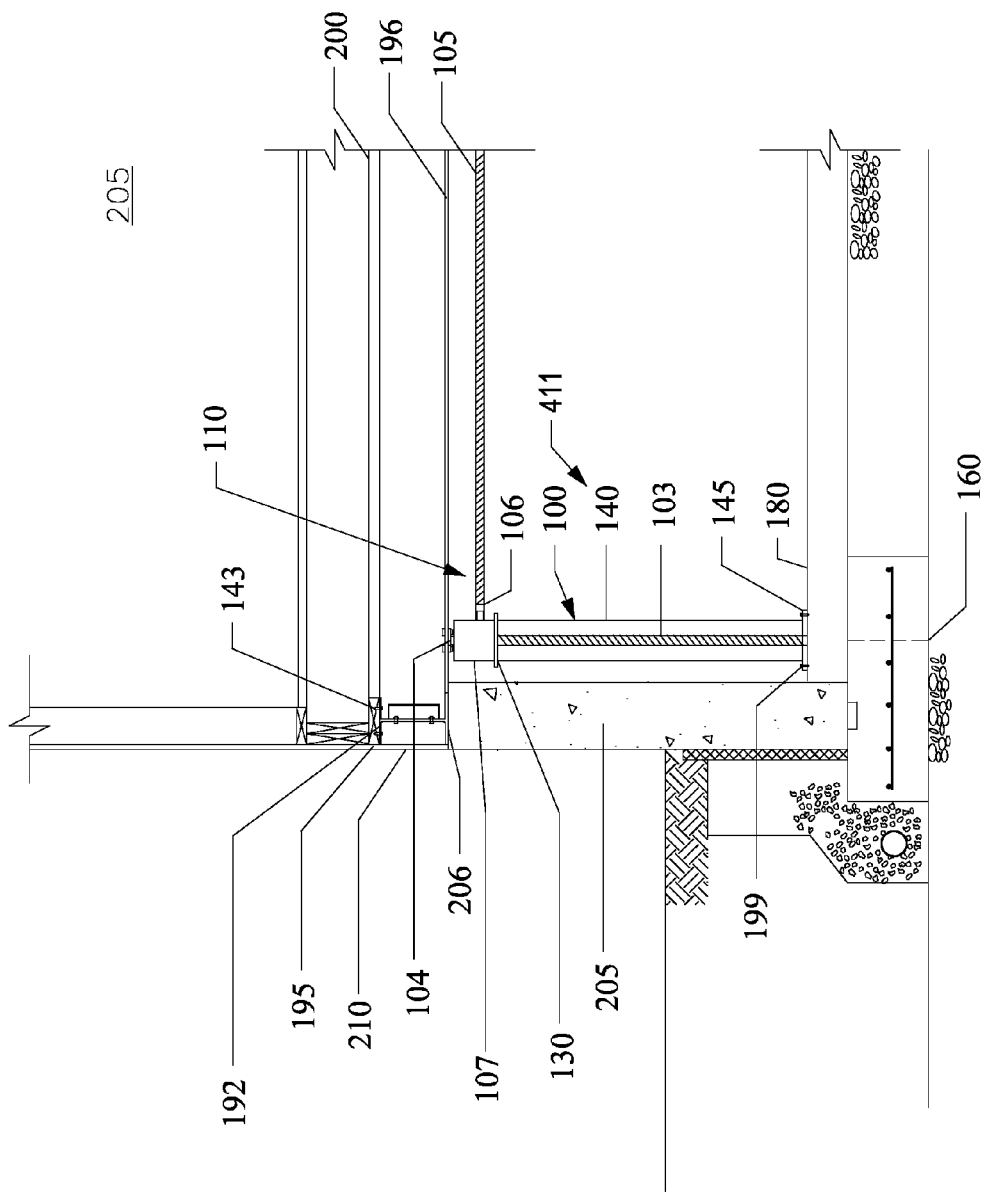
FIG. 4 is an expanded side view, in part cross section, of components of the system shown in FIG. 1.
Figure 5:
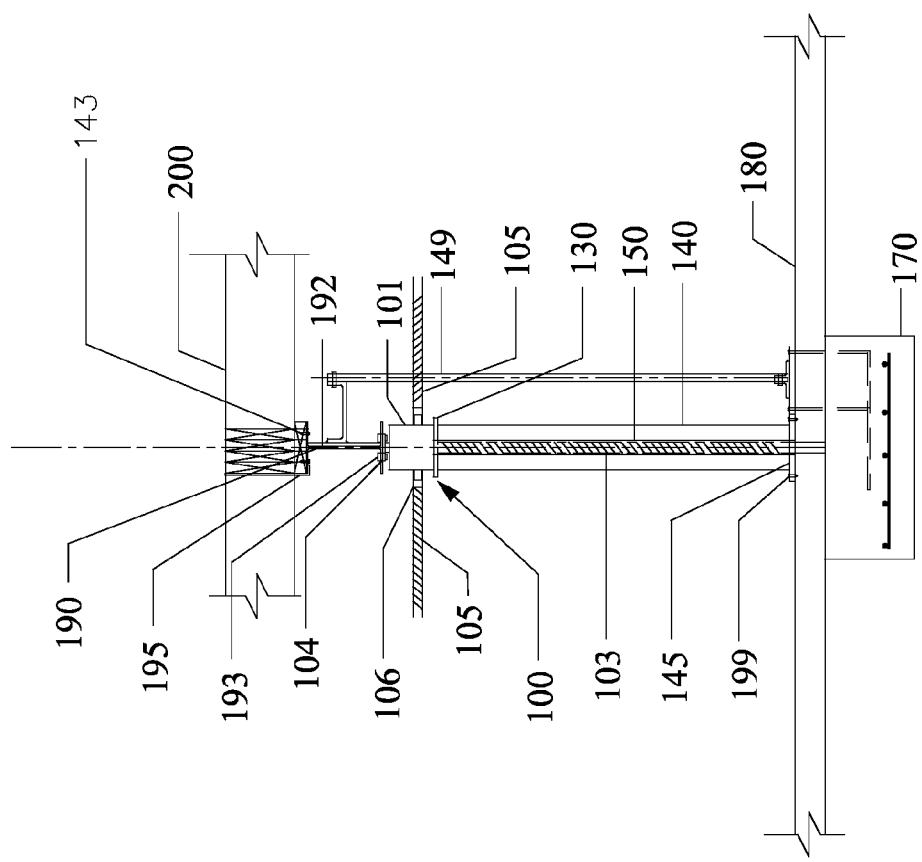
FIG. 5 is an expanded side view, in part cross section, of components of the system shown in FIG. 1.

FIGS. 4 and 5 show the embodiment of the liftable building system 10 wherein the house 410 rests on structural steel frame 190. The liftable building system 10 does not rely upon a rising floodwater, but may be lifted off of the permanent concrete foundation 101 upon activation of lifting system 110.

Lifting system 110 is configured for lifting or raising house 410 with respect to the ground and foundation 101. Lifting system 110 is disposed within the cavity 411 defined by concrete wall siding 205 of the foundation 101 and is disposed between the support frame 190 and the concrete slab 180. Lifting system 110 extends between a first end and a second end. The first end is in communication with the support frame 190. The second end is in communication with the foundation 101, for example, the concrete slab 180 so that actuating the lifting system 110 applies a force to axially displace in a substantially up and down direction the support frame 190 with the house 410 along or with the guideposts 147 relative to the foundation 101 and ground G. In one embodiment, as shown in FIG. 8, as the lifting system 110 is actuated, support frame 190 with house 410 is raised or lowered with the telescopic guideposts 147 causing the telescopic guideposts 147 to expand or contract, respectively. In one embodiment, as shown in FIG. 9, as the lifting system 110 is actuated, support frame 190 with house 410 axially translate along and relative to guideposts 147 via collar 249.

Lifting system 110 includes a plurality of linear actuators 100 disposable between the concrete slab 180 and the support frame 190. Linear actuators 100 extend out of a steel housing 107. The linear actuator 100 is capable of extending 1 foot to 10 feet from steel housing 107. In some embodiments, actuator 100 is capable of extending more than 10 feet from steel housing 107 depending on the requirements of the particular location in which system 10 is situated.

Lifting system 110 further includes horizontal drive shafts 105 coupled or connected to the plurality of linear actuators 100. As the horizontal steel drive shafts 105 rotate via actuation of a motor 111, the linear actuators 100 axially translate in a direction away from the foundation 101 so as to exert an upward force on the house 410. Actuating the lifting system 110 applies a force to axially displace the support frame 190 with the house 410 along or with the plurality of guideposts 147 relative to the foundation 101 creating a gap between the upper portion 205 of concrete wall siding 205 and the house 410.

Motor 111 is used to drive the actuation of lifting system 110. A limit switch 250 can be used, which limits the total axial displacement of the linear actuator 100 whereby limiting the total axial displacement of the support frame 190 and the house 410. The limit switch 250 is electrically coupled to the motor 111 to prevent the linear actuators 100 from rising above a predetermined height. The limit switch 250 can be set to count the number of turns of a load screw 103, to be further described below. Once a count value has been reached, the limit switch 250 sends a signal to the motor 111 to turn off. This can be done manually or remotely. The lift system 110 can also be stopped manually. In one embodiment, the limit switch 250 is a structural component that is engaged to a portion of guideposts 147 so as to prevent support frame 190 from translating past the limit switch 250.

Figure 7:
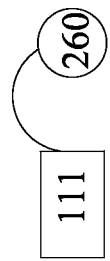
FIG. 7 is a schematic view of an on/off switch and motor.
Figure 6:
FIG. 6 is a schematic view of a backup generator.

An on/off switch 260 for the motor 111 is connected to a sensor preventing the motor 111 from activating if the sensor is interrupted. In one embodiment, the on/off switch 250 shown in FIG. 7 is connected to an infrared photoelectric sensor 230. The infrared photoelectric sensor 230 prevents the motor 111 from activating if the sensor is interrupted. This is a safety mechanism that prevents system 10 from being activated. The photoelectric sensor 230 is part of the safety mechanism that is used to detect the distance, absence, or presence of objects by using an infrared light transmitter and a receiver. Sensor 230 is connected to an audible alarm, flashing lights and motor 111. If an object is detected it will trip the alarm, flash its lights and immediately turn off the motor 111. System 110 includes a steel support post 112 for motor 111. System 10 further includes a power source and controller switch 120.

Figure 2:
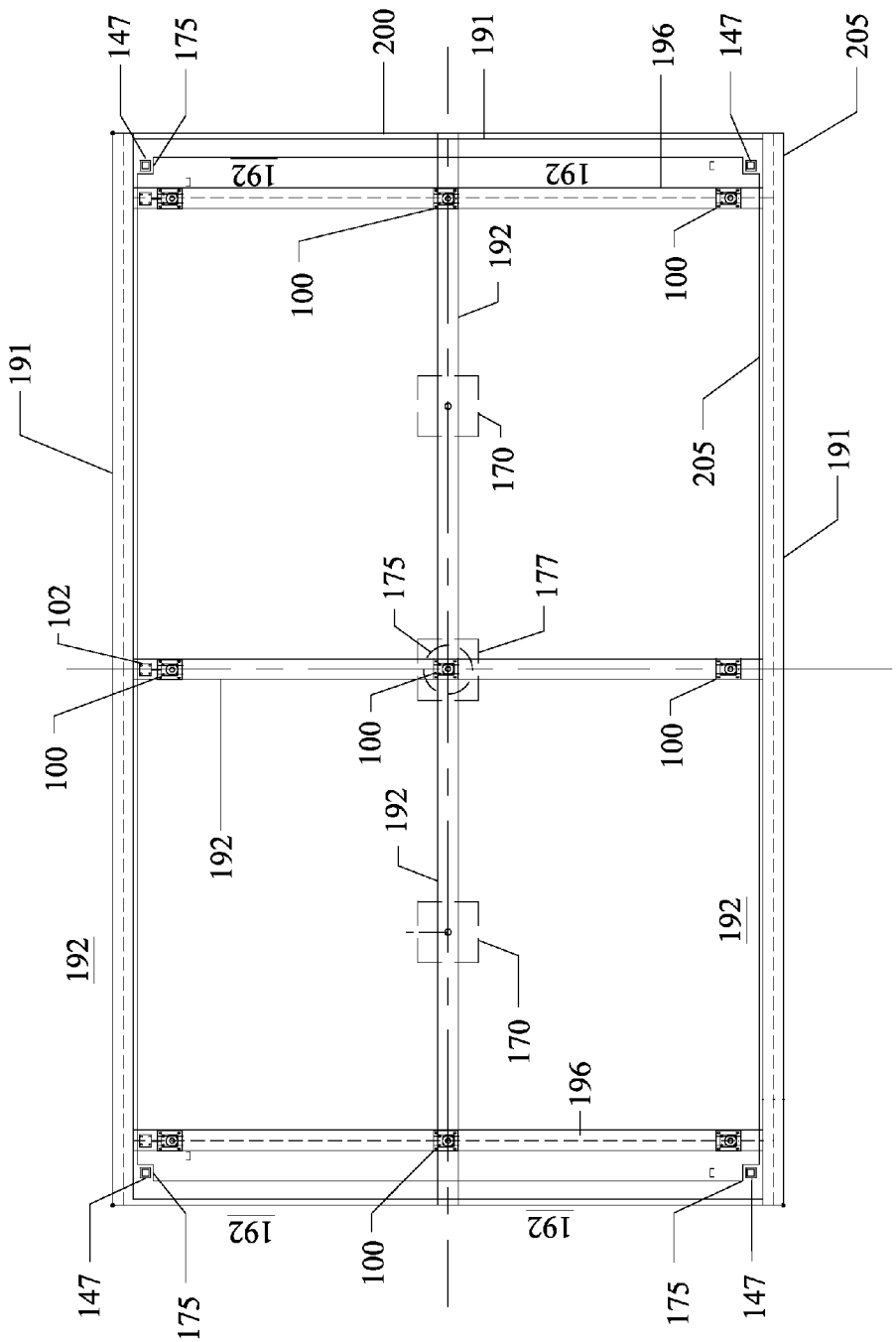
FIG. 2 is a cutaway, plan view, of components of the system shown in FIG. 1.

As depicted in FIGS. 1-3, provided are a series of linear actuators 100, gear boxes 102, and horizontal steel drive shafts 105 connected to motor 111. These components of lift system 110 cause load screws 103 to rise to raise or lift support frame 190 with house 410. At least six linear actuators 100 distributed symmetrically about support frame 190 are preferably used to raise and lower the structural frame 190 evenly. The linear actuators 100 are distributed along the inside perimeter of the permanent foundation wall siding 205 and along the center line and/or corners of house 410. The motor 111 is located near the center of the house 410 inside the crawl space 411. When the lifting system 110 is actuated, motor 111, which is attached to the linear actuator 100 via a steel coupling 106, activates the linear actuator 100. The drive shaft 105 is attached to gear box 102 via a steel coupler 106. As the steel drive shaft 105 rotates it causes the screw 103 to extend out of the housing 107 whereby the screw 103 exerts an upward force on the structural steel frame 190 through steel support plate 104. As a result of this upward force, the structural steel frame 190 lifts off of the concrete foundation wall side 205. The structural steel support frame 190 can be lowered back onto the concrete foundation wall side 205 by reversing the motor 111.

Figure 10:
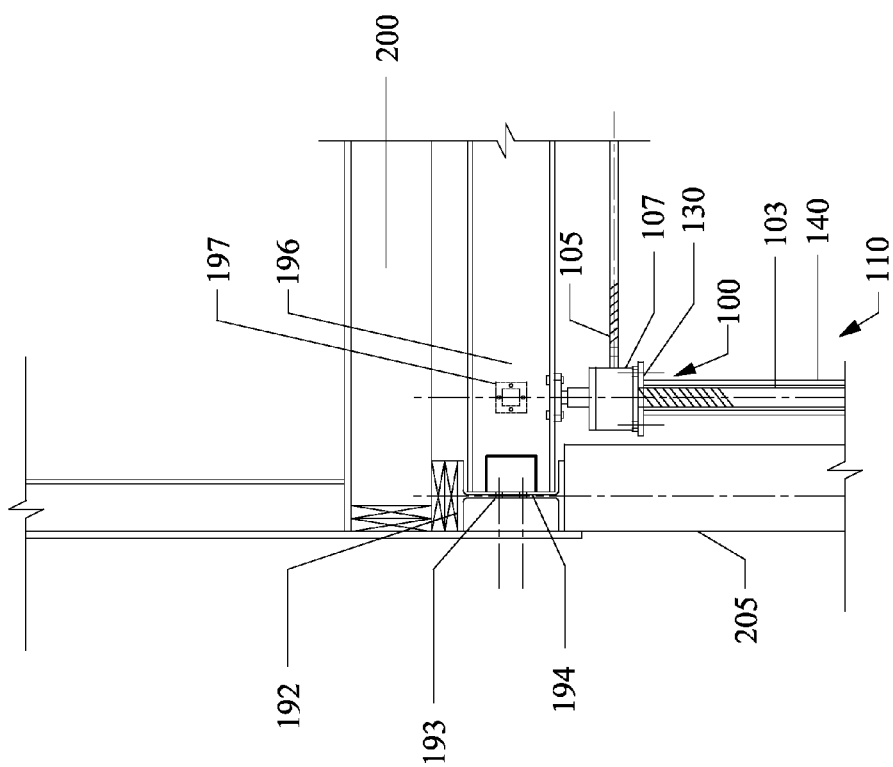
FIG. 10 is an expanded side view, in part cross section, of components of the system shown in FIG. 1

The lifting system 110 can be mechanical, hydraulic, pneumatic, electric and/or engine driven. FIGS. 4, 5 and 10 illustrate an embodiment of system 10 wherein lift system 110 is in the form of a mechanical lift system. The linear actuator 100 is a machine screw type with a high strength load screw 103 and high strength gearing. The gears are housed in an aluminum, iron or steel housing 107. The top portion of linear actuator 100 is connected to a steel support plate 104, which rests flush against the lower surface of the structural steel frame 190 and through a series of steel bolts 193 that are attached to the structural steel support frame 190 via a steel angle 194. A steel bracket 196 of frame 190 is stabilized through a stabilizer strut 197, which prevents lateral movement of the actuator 100 during activation. The steel support plate 104 is attached to the top of the steel load screw 103 at certain locations of the structural steel frame 190, such as, for example, the four corners of frame 190.

Directly above the concrete slab 180 and aligned with the base of the linear actuator 100 is a steel tube column 140. Column 140 contains linear actuator 100. A bottom end of the steel tube column 140 is welded to a base plate 145, which is bolted to the concrete slab 180 via lag bolts 199. A top end of the steel tube column 140 elevates and supports a steel top plate 142 of linear actuator 100 and is welded to the steel tube column 140 with HS steel bolts 193. Since column 140 supports the weight of the house 410, column 140 will be subjected to the greatest amount of force when the mechanical lifting system 110 is actuated. The steel tube column 140 is supported by the continuous wall footing 160, isolated concrete footing 170 and/or concrete pier 175 which may extend several feet into the ground. In one embodiment, column 140 is a structural steel tube/concrete/wood or composite that supports the motor and gear box 102. The column 140 is used during lifting to support the actuator 100 and to transfer the applied downward force of the house 410 to the concrete foundation 101.

In one embodiment, the steel tube column 140 has a 2 inch wide vertical steel slot 150 to provide a simple method of removing the linear actuator 100 and steel load screw 103 from its mounting atop the column 140. This will allow for the servicing of the linear actuator 100. Normal servicing includes cleaning, lubrication and visual examination of the linear actuator 100 and horizontal steel drive shafts 105. After a storm event, the crawl space/basement area 411 may need to be dewatered via the sump pump 215 and cleaned of all debris, wood, branches etc. The perimeter of the building foundation 101 will need to be cleaned of all debris, wood, branches etc. The foundation wall siding 205, flexible lines and rubber membrane 250 will need to be visually inspected and repaired if necessary. The quick disconnect waste line will need to be reconnected to the house trap.

The mechanical lifting system 110 will incorporate safety features to lock the house 410 in place once lifted. For example, the system may 10 include an automatic or manual mechanical lock that will lock the actuators 100 in a raised or stationary position. The system 10 can lift the structural support frame 190 in stages or incrementally. System 10 further includes a bracing structure 430, such as, for example, a network of adjustable steel cross-bracing fastened to the structural steel frame 190 and the concrete foundations 101 when the house 410 is in both the up and down positions. The bracing structure 430 extends between the foundation 101 and the support frame 190 so as to stabilize the house 410 when the house 410 is in a raised position. The steel bracing system 430 may be comprised of tube steel, flat plate or heavy duty threaded rod components fastened to permanent steel connectors and mounted to the steel support frame 190 and concrete foundation 101. In some embodiments, the bracing system 430 is retractable to a non-stabilizing position when the house 410 is lowered to grade or ground level 305. It is contemplated that bracing structure 430 is variously configured, such as, for example, a series of telescopic columns, arches, beams, and/or rigid columns. System 10 may further include a perimeter steel guard rail system engaged to the underside of the support frame 190 to protect bracing structure 430 from floating debris.

Figure 11:
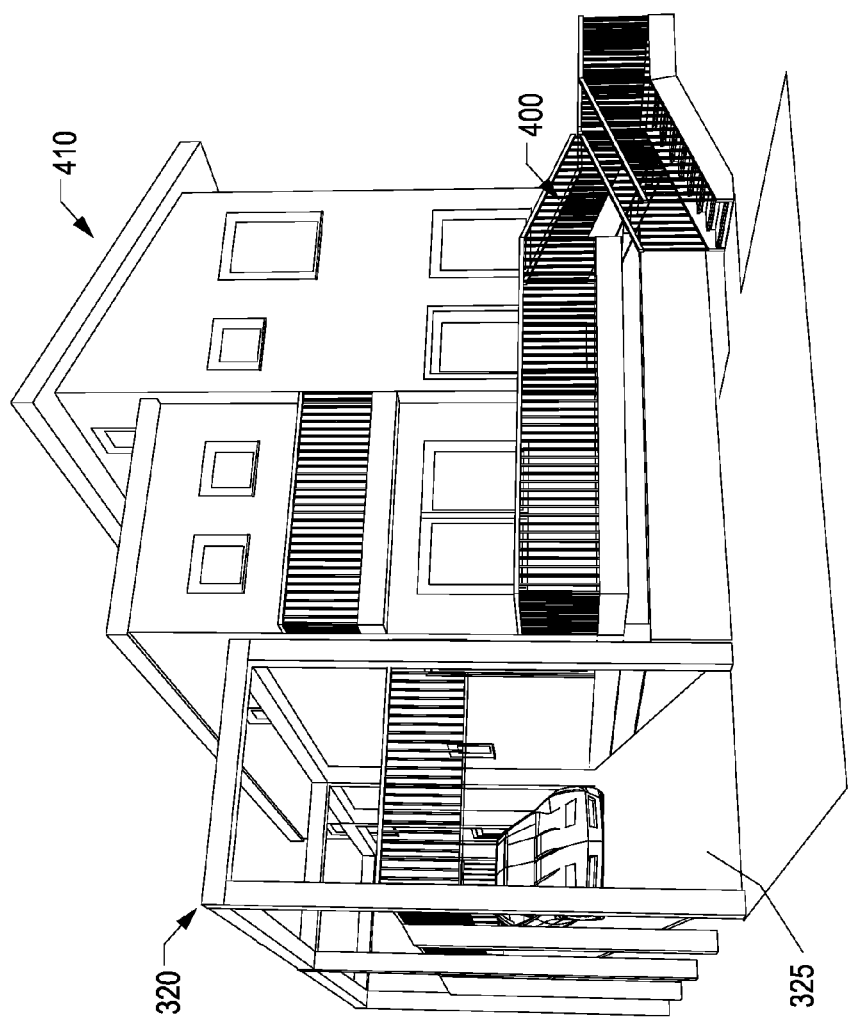
FIG. 11 is a perspective view of components of the system shown in FIG. 1 in a lowered position with a ramp and an automobile.

FIG. 12 shows the effect of the linear actuator 100 in the fully extended position wherein the house 410 has been lifted, while FIG. 11 shows the effect of the linear actuators 100 in the lowered position. When the linear actuators 100 are in the lowered position, the structural steel support frame 190 is supported on the building foundation wall siding 205 as shown in FIG. 4.

The lift system 110 has flexible electric, gas, telephone and water service lines 220 as well as a quick disconnect waste line 225 for safe and easy disconnection of primary utilities. Flexible lines 225 can be made of copper, PVC, Pex tubing, plastic, steel or HPDE pipe. The quick disconnect line 225 can be constructed of flexible pipe made from Pex tubing, PVC tubing, rubber, HDPE corrugated or solid pipe or composite materials. The connectors may have couplings or fittings made of steel, brass, iron, stainless steel, zinc electroplated, galvanized steel or rubber.

The primary utility lines leading to the house 410 are configured to be flexible. A safe quick disconnect coupling is provided for the simple disconnection and re-connection of sanitary waste lines 225. The quick couplings of the primary utility lines and sewer lines may have certain flexibility for easier manipulation and for allowing a certain amount of movement in the cavity or crawl space/basement 411. The sewer waste lines 225 quick coupling is similar to a quick connect/disconnect coupling used on fire trucks for hookup to a fire hydrant.

A backup utility system electric generator 240 is located outside and a distance away from the house 410. In some embodiments, the backup generator 240 is gas, propane or solar. It is contemplated that the motor 111 can be powered by an electric service which is connected to back-up generator 240 in case of power failure. In one embodiment, motor 111 can be powered by a photovoltaic (solar) power source with battery storage. The motor 111 can be electrically, hydraulically or pneumatically powered.

The operation of the liftable building system 10 is as follows. When the floodwater rises or other weather conditions are looming, lifting system 110 is activated via on/off switch 260 that is mounted on the outside of the house 410. The linear actuators 100 drive the upward axial translation of the structural steel support frame 190 with house 410 along or with the guide posts 147, which provide lateral stability for system 10.

The system 10 is reliable, stable and relatively simple to construct. The system 10 withstands hurricanes since it is confined between the fixed guide posts 147 and slides along or with them. The system 10 being confined between fixed guide posts 147 is much more stable than a house on a standardized foundation, especially when the house is raised.

The system 10 eliminates the need to build building structures on elevated foundations in flood prone areas without the fear of flooding the habitable spaces of the building structure.

System 10 may be used in circumstances where the rising floodwater is the result of flash floods or storm surges. In this situation, the building structure may be lifted off of foundation 101 by activating the lifting system 110. By lifting the house 410 out of the direct path of the surging floodwater, potential damage to the structure may be avoided.

Figure 13:
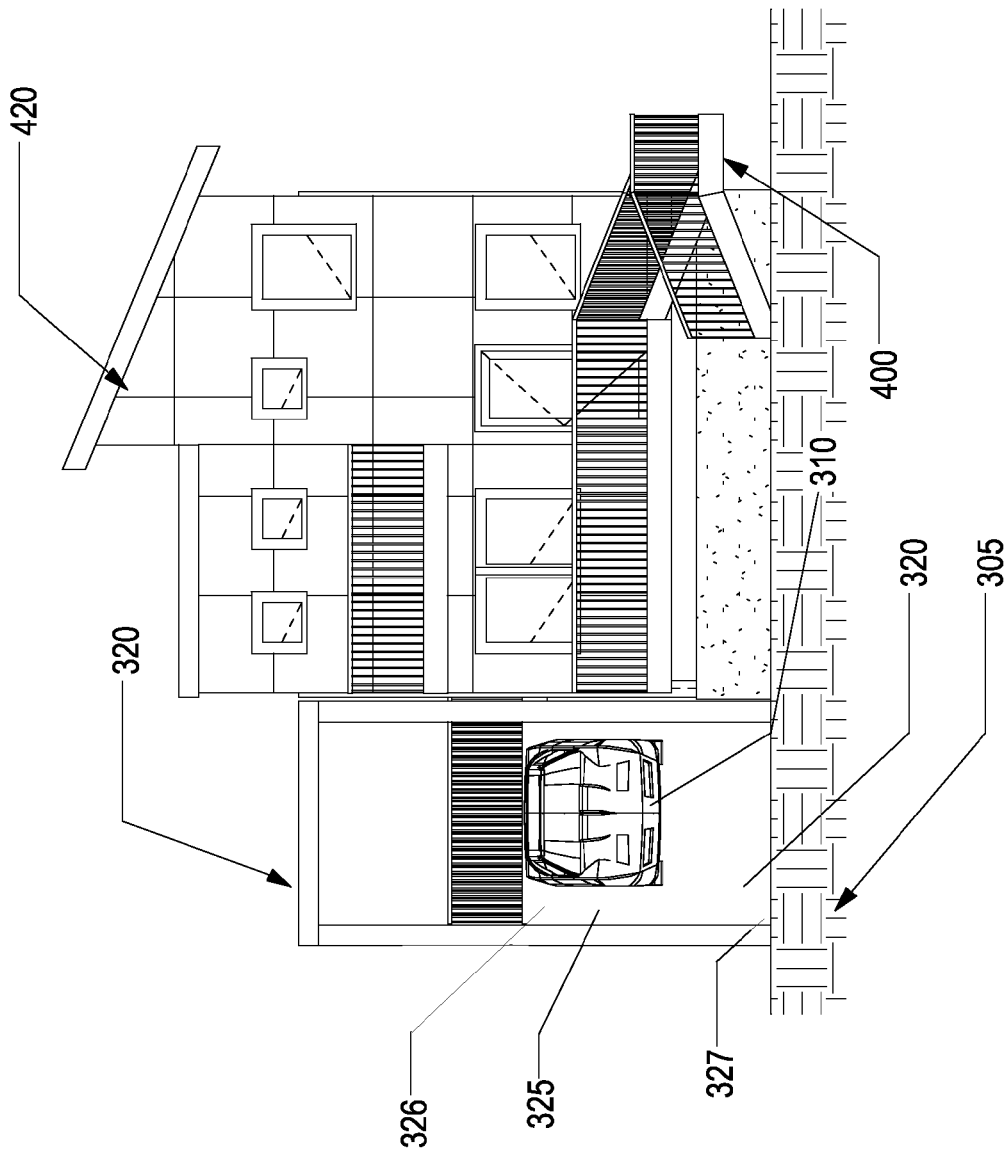
FIG. 13 is front end view of components of the system shown in FIG. 11 with the ramp in a lowered position.
Figure 14:
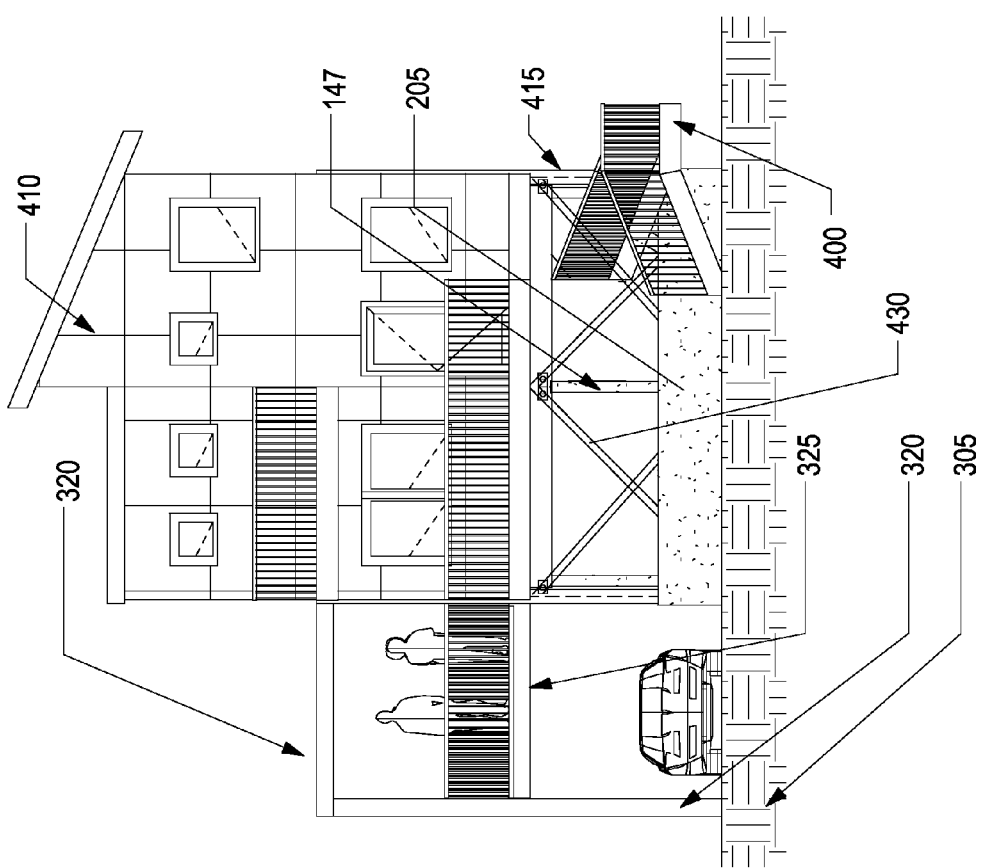
FIG. 14 is a front end view of components of the system shown in FIG. 11 with the ramp in a raised position.
Figure 15:
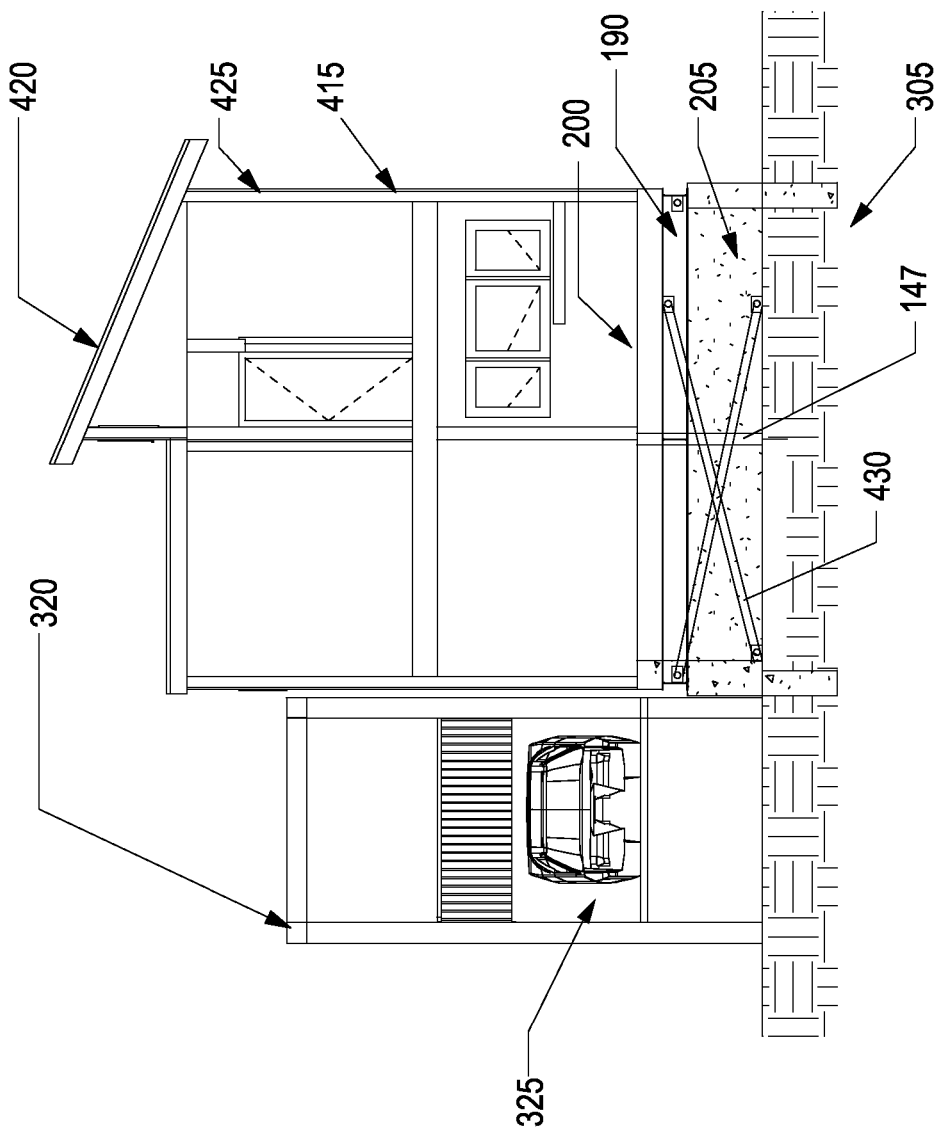
FIG. 15 is a rear end view of components of the system shown in FIG. 11 with the house and the ramp in a lowered position.
Figure 16:
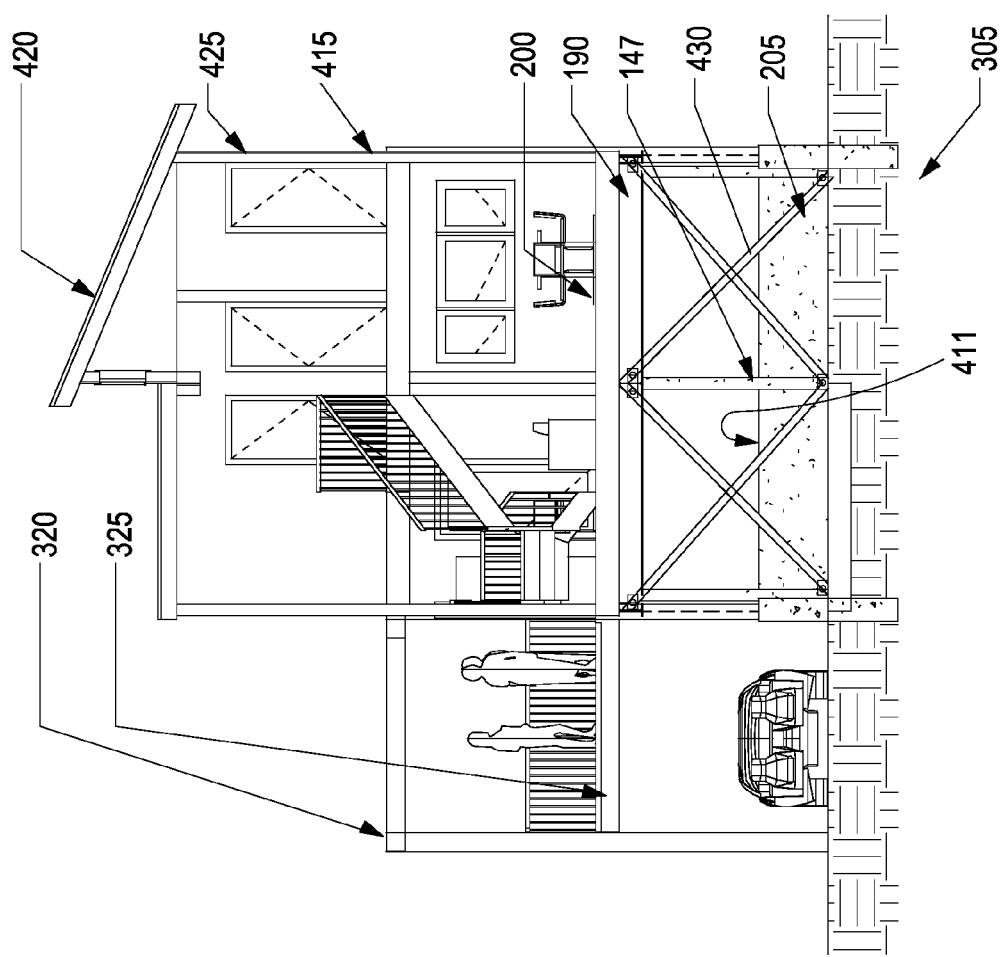
FIG. 16 is a rear end view of components of the system shown in FIG. 11 with the house and the ramp in a raised position.
Figure 17:
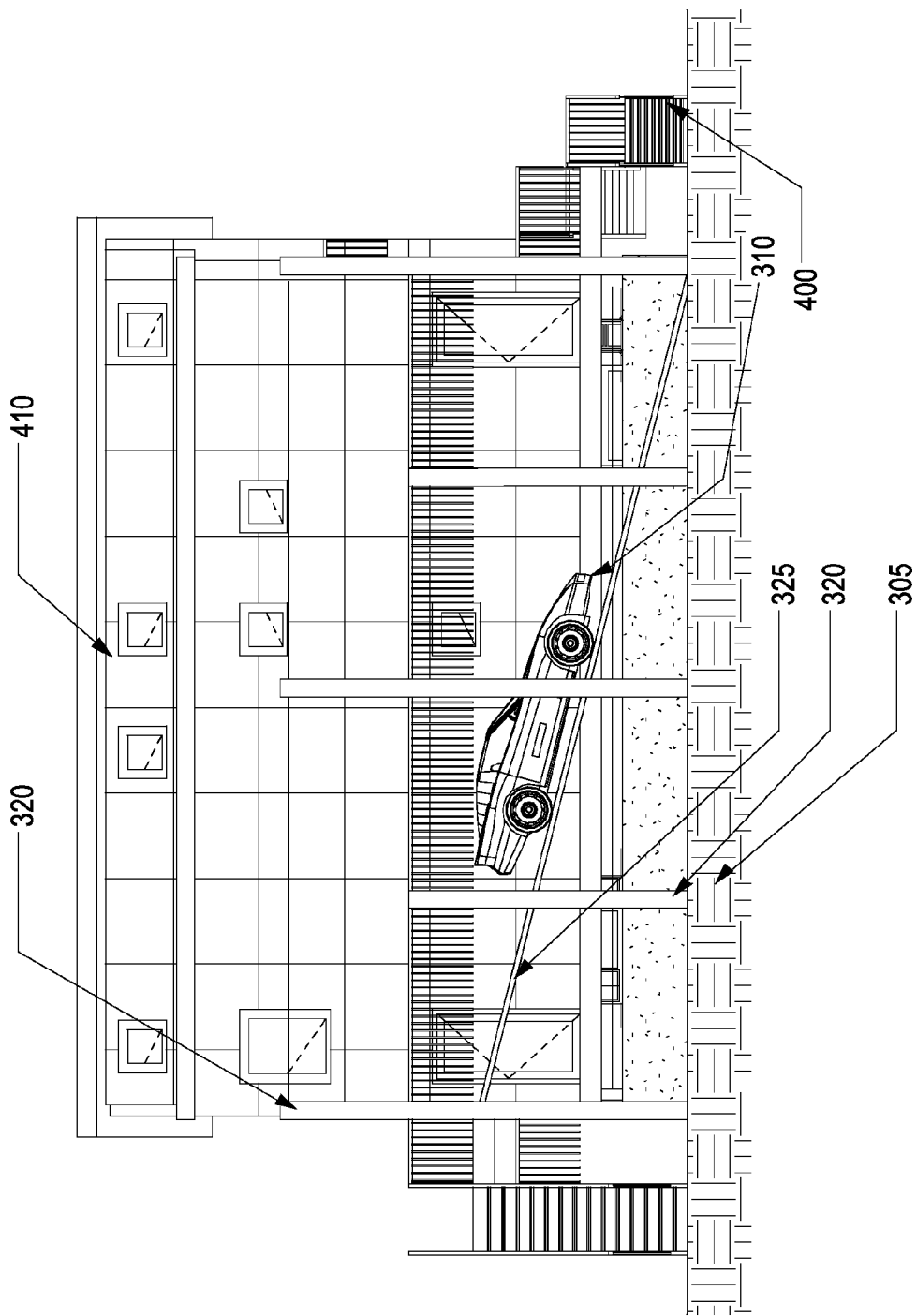
FIG. 17 is a side view of components of the system shown in FIG. 15.
Figure 18:
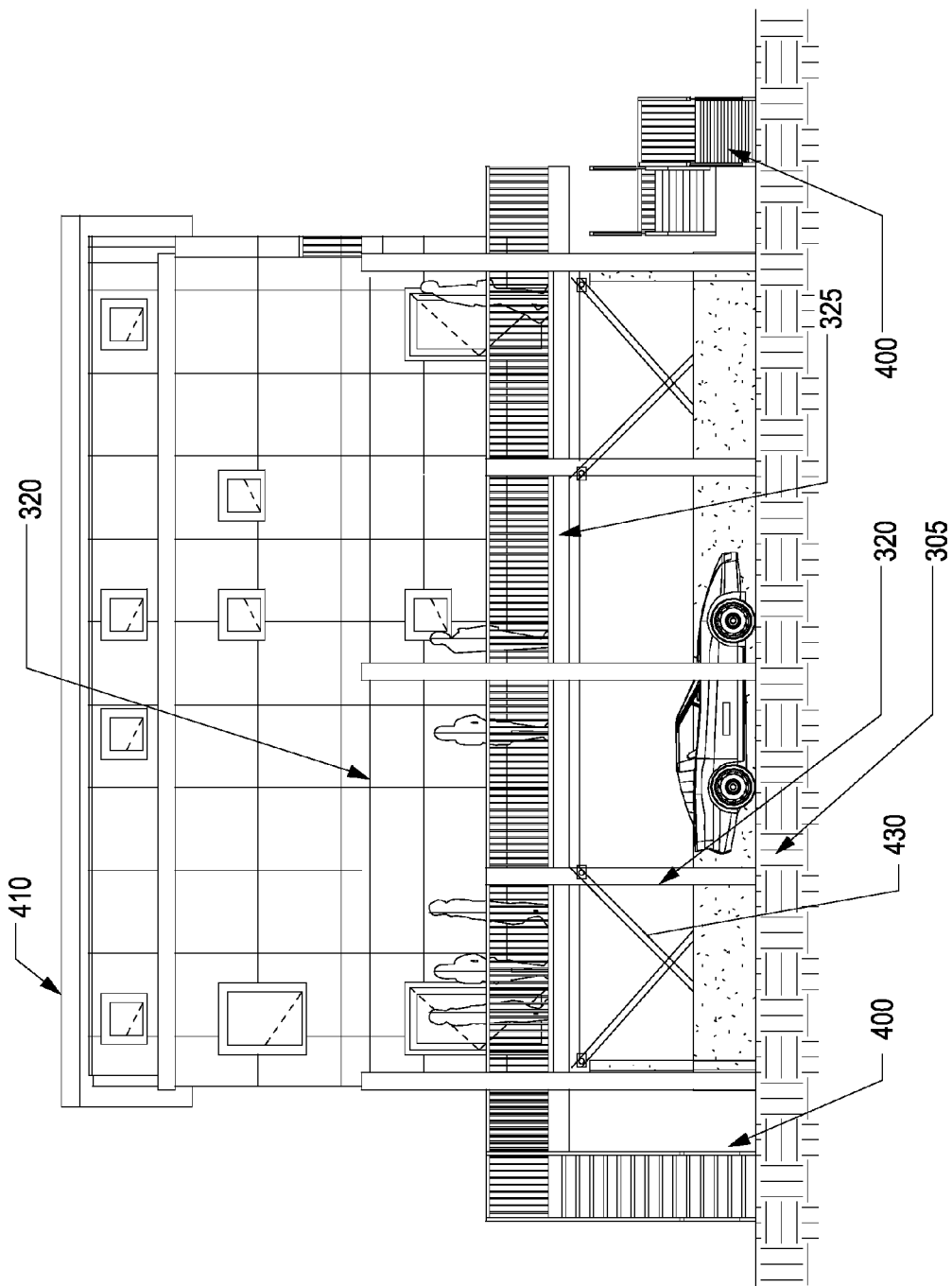
FIG. 18 is a side view of components of the system shown in FIG. 16.
Figure 19:
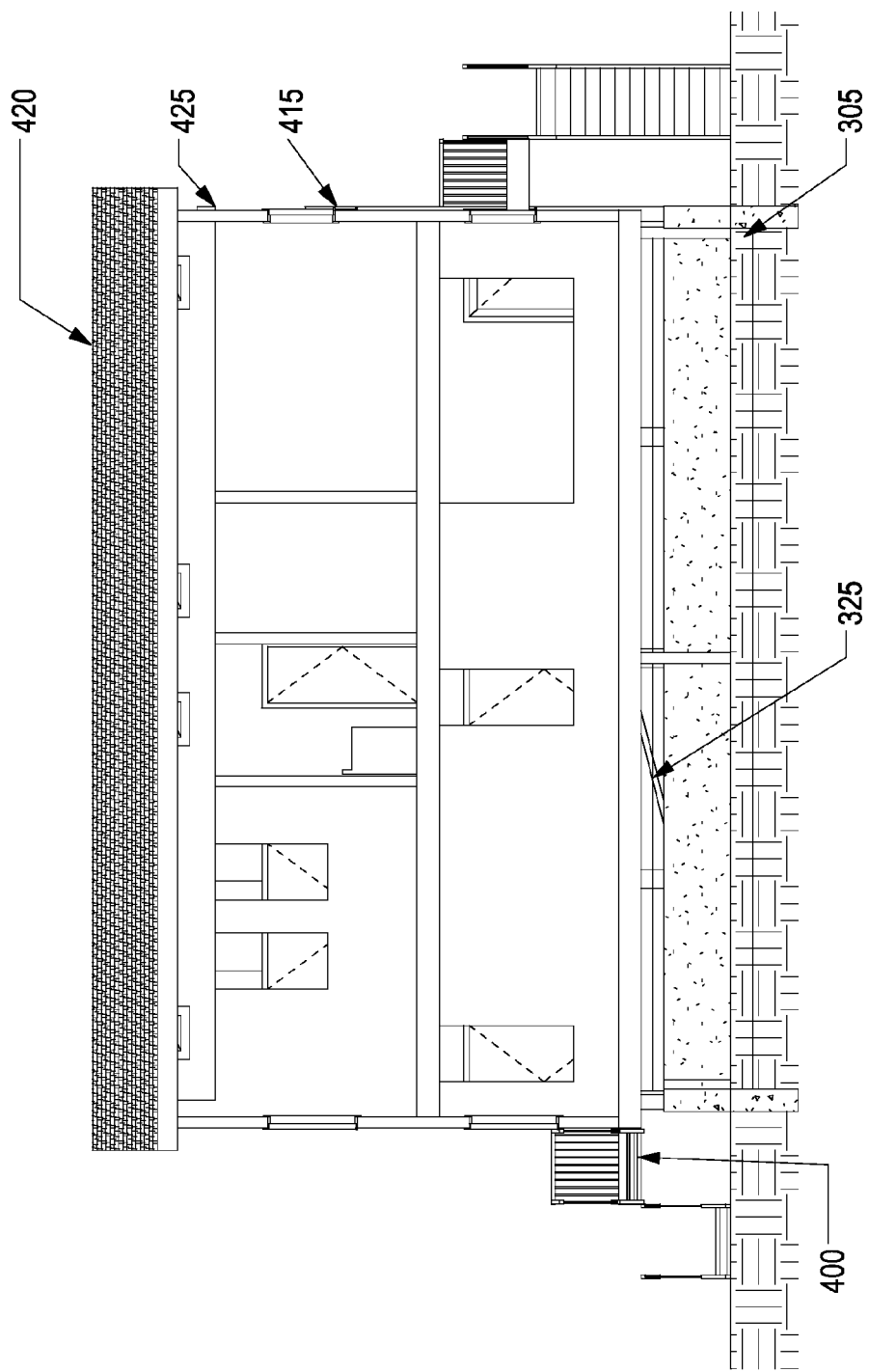
FIG. 19 is an alternative side view of components of the system shown in FIG. 15.
Figure 20:
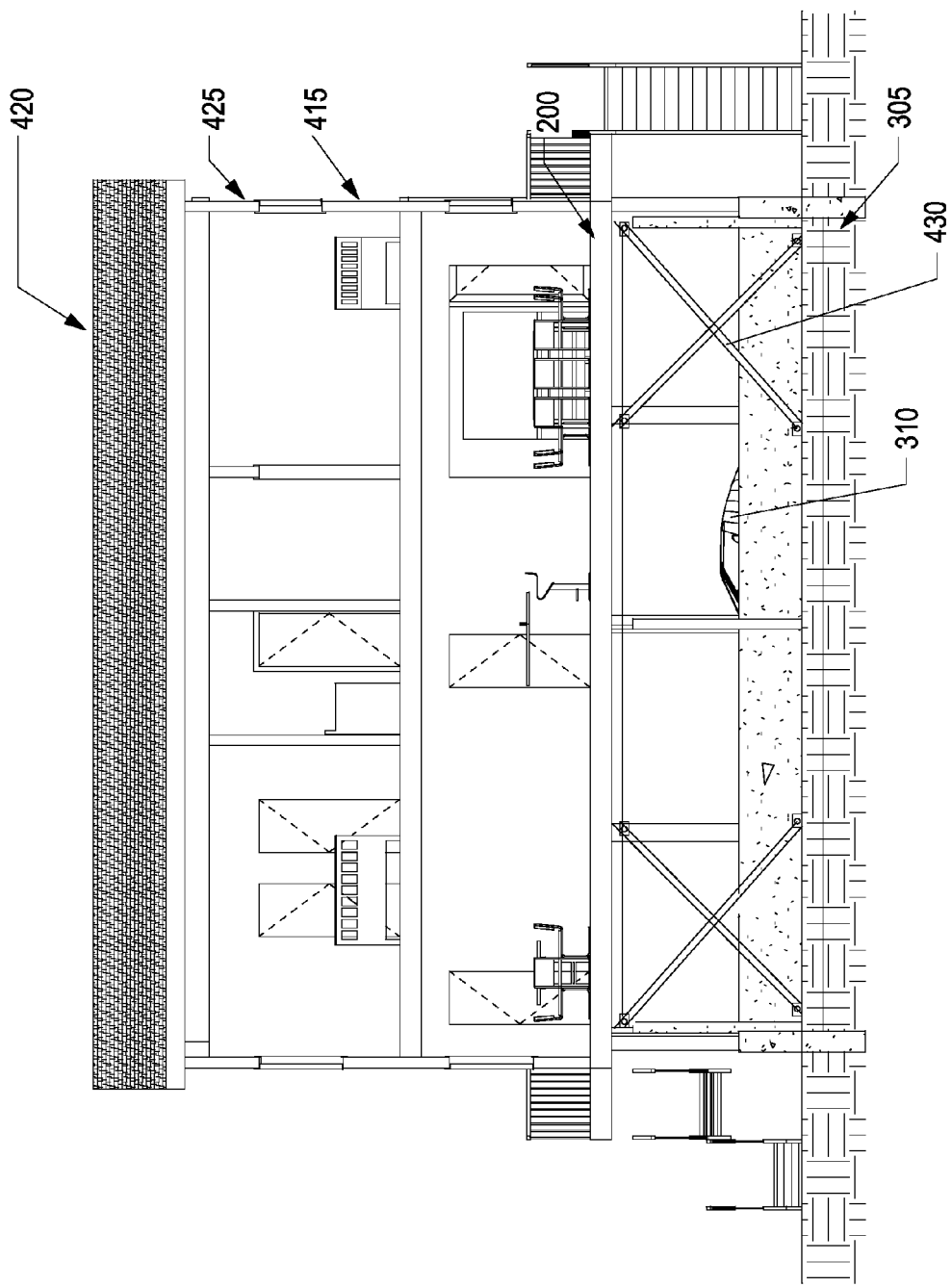
FIG. 20 is an alternative side view of components of the system shown in FIG. 16.
Figure 21:
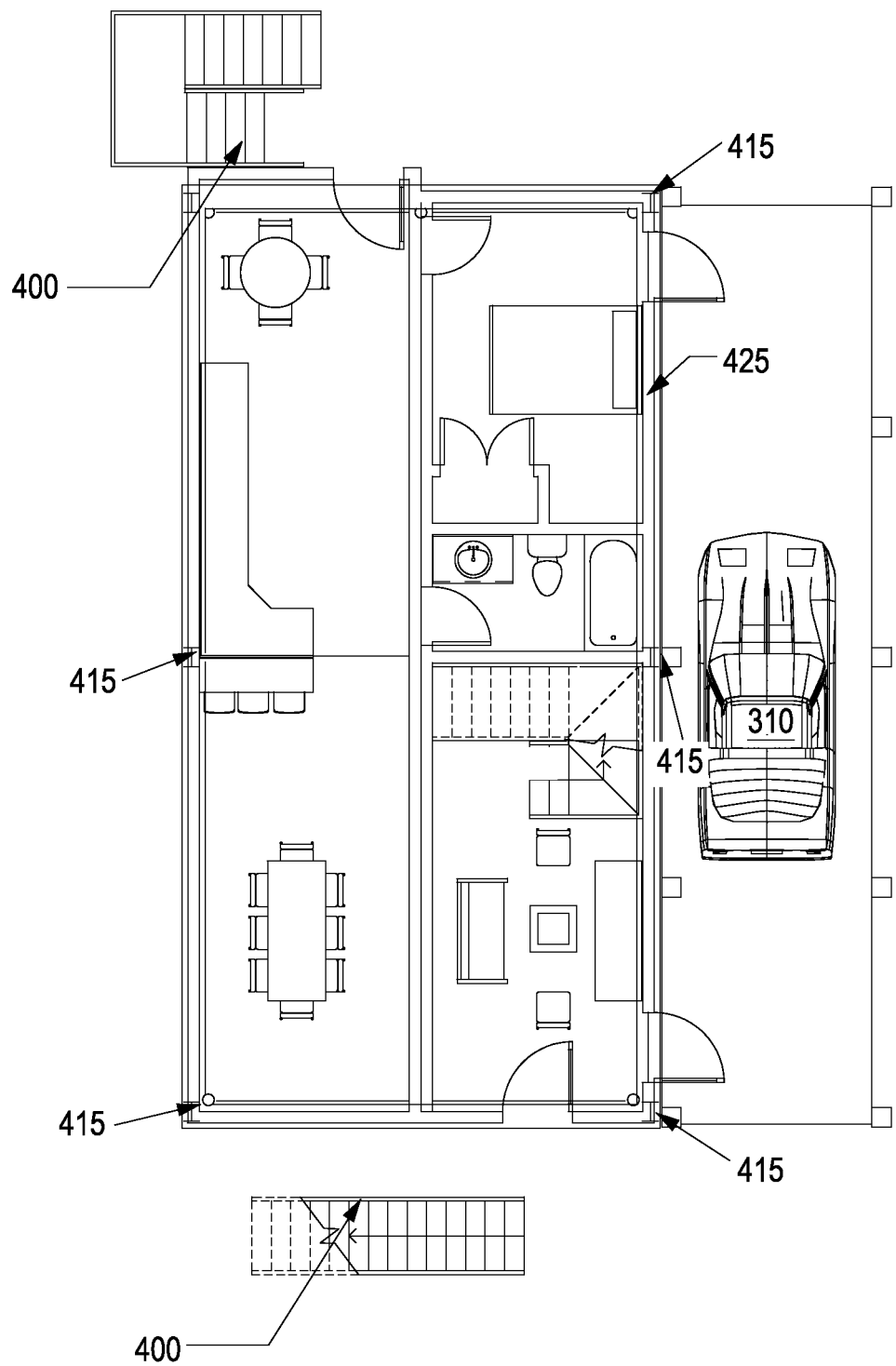
FIG. 21 is top cross sectional view of components of the system shown in FIG. 11.
Figure 22:
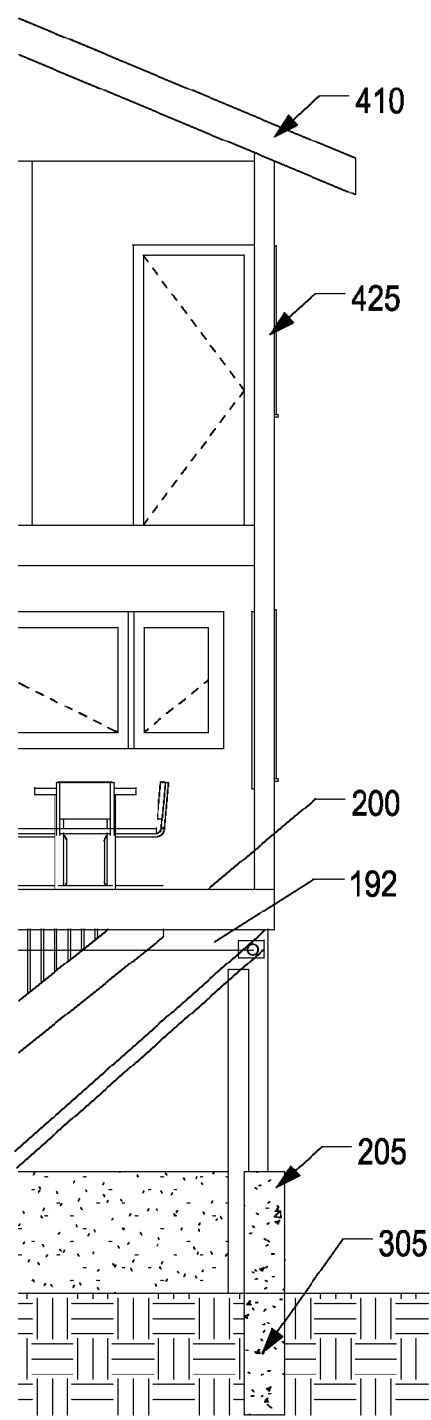
FIG. 22 is a cutaway view of components of the system shown in FIG. 16.

In one embodiment, a flexible deck/ramp structure 325 adds the ability to raise an automobile 310 above grade 305 during flooding conditions. As shown in FIG. 12, for example, the flexible deck/ramp 325 may serve as an exterior entertainment surface during non-flood usage. Ramp 325 extends between a first end 326 and a second end 327, as shown in FIG. 13. First end 326 is fixedly engageable with a structural support framing, such as, for example, support element 320. Second end 327 is detachably engageable with support element 320. Support element 320 includes a series of vertically disposed columns and horizontally disposed beams adjacent to house 420. When the second end 327 is connected to the support element 320, ramp 325 is substantially parallel with the ground G and is elevated from the ground in a raised position as can be seen, for example, in FIG. 12. When the second end 327 is disconnected or disengaged from the support element 320, the second end 327 of ramp 325 is lowered such that an automobile 310 may be temporarily placed on the ramp 325 during, for example, flood conditions. That is, upon flood conditions, one end of the deck/ramp structure is disconnected from the structural support element 320 and lowered into a lowered ramp position, as can be seen, for example, in FIG. 11, upon which automobile 310 may be temporarily stored during flood conditions. It is contemplated that the materials of deck/ramp 325 and structural support element 320 may be structural steel framing, reinforced concrete, or lightweight carbon reinforced concrete.

In the event of flood conditions occurring, an owner may unclip one end of the deck/ramp structure 325 and then lower it into the down position using a block and tackle pulley system. Alternatively, the ramp/deck structure 325 may be raised or lowered utilizing a ratcheted mechanical clamp system, a hydraulic lift piston or an electric lift piston. During non-flood conditions and daily use, deck/ramp 325 is hoisted into the raised position using a block and tackle pulley system, and locked into place using a locked peg connector. The peg is engagable with the ramp 325 and the support element 320 to lock and unlock the ramp 325 with the support element 320. Alternatively, the deck/ramp 325 may be locked into position utilizing a ratcheted locking mechanism, a through bolted connection or an eyehook with padlock system.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. A liftable building system, comprising:
a building structure;
a foundation configured for supporting the building structure;
a substructure disposable between the foundation and the building structure;
at least one guidepost in communication with the building structure, the substructure and the foundation; and
a lifting system comprising a motor, at least one linear actuator, and at least two horizontal steel drive shafts connected to the at least one linear actuator, the lifting system extending between a first end and a second end, the first end being in communication with the substructure and the second end being in communication with the foundation so that actuating the lifting system applies a force to axially displace in a substantially up and down direction the substructure with the building structure along or with the at least one guidepost relative to the foundation,
wherein the at least one guidepost has a telescopic configuration and the substructure is fixedly engaged to the at least one guidepost such that as the substructure axially translates in an up and down direction, the at least one guidepost telescopically expands and contracts with the substructure,
wherein as the at least two horizontal steel drive shafts rotate via actuation of the motor, the at least one linear actuator axially translates in a direction away from the foundation so as to exert an upward force on the substructure and building structure.

2. The system of claim 1, wherein the lifting system is mechanical, hydraulic, pneumatic, electrical, engine driven, or combinations thereof.

3. The system of claim 1, wherein the lifting system further comprises a limit switch that limits the total axial displacement of the at least one linear actuator whereby limiting the total axial displacement of the substructure and the building structure.

4. The system of claim 1, wherein the foundation comprises a concrete wall footing disposable within ground and a concrete wall siding in substantially perpendicular engagement with the concrete wall footing so as to create a gap between the substructure and the concrete wall footing.

5. The system of claim 4, wherein the foundation further comprises a concrete slab disposable with the concrete wall footing and/or ground, wherein the lifting system is disposable between the concrete slab and the substructure such that actuation of the lifting system applies a force on the substructure to axially displace the substructure with the building structure along or with the at least one guidepost relative to the concrete wall siding.

6. The system of claim 1, wherein the at least one guidepost is disposed adjacent at least one corner of the substructure.

7. The system of claim 1, wherein the substructure includes at least one collar coupled to the at least one guidepost such that the substructure is axially translatable along and relative to the at least one guidepost.

8. The system of claim 1, wherein the substructure comprises a structural support frame comprising steel, concrete, wood, composite, or a combination thereof.

9. The system of claim 8, further comprising a rubber membrane in communication with the structural support frame to protect the structural support frame during inclement weather and providing a barrier between a finished grade and the structural support frame.

10. The system of claim 1, further comprising a bracing structure extending between the foundation and the substructure so as to stabilize the building structure when the building structure is in a raised position.

11. The system of claim 10, wherein the bracing structure is retractable to a non-stabilizing position when the building structure is lowered to grade level.

12. The system of claim 1, further comprising a pump pit with a sump pump installed within the foundation such that a cavity defined by the foundation may be dewatered after flood waters have receded.

13. The system of claim 1, wherein the at least one guidepost is embedded in the foundation and projects upwardly from the foundation about 4 feet to about 10 feet above the foundation so as to provide stability to the building structure as the building structure is being raised.

14. The system of claim 1, further comprising a utility line and a sewer line in communication with the building structure and being flexible and removably coupled for quick connects and disconnects with the building structure.

15. A liftable building system, comprising:
a building structure;
a ramp extending between a first end fixedly engagable with a support element and a second end detachably engagable with the support element, the support element being adjacent to the building structure;
a foundation configured for supporting the building structure;
a substructure disposable between the foundation and the building structure;
at least one guidepost in communication with the building structure, the substructure and the foundation; and
a lifting system comprising a motor, at least one linear actuator, and at least two horizontal steel drive shafts connected to the at least one linear actuator, the lifting system extending between a first end and a second end, the first end being in communication with the substructure and the second end being in communication with the foundation so that actuating the lifting system applies a force to axially displace in a substantially up and down direction the substructure with the building structure along or with the at least one guidepost relative to the foundation,
wherein when the second end of the ramp is connected to the support element, the ramp is substantially parallel with ground, and when the second end of the liftable ramp is disconnected from the support element, the ramp is lowered such that an automobile may be temporarily placed on the ramp during flood conditions,
wherein as the at least two horizontal steel drive shafts rotate via actuation of the motor, the at least one linear actuator axially translates in a direction away from the foundation so as to exert an upward force on the substructure and building structure.

16. The system of claim 15, wherein the ramp is lowered and raised using a pulley system and a peg is engagable with the ramp and the support element to lock and unlock the ramp with the support element.

17. A liftable building system, comprising:
a building structure;
a foundation configured for supporting the building structure;
a substructure disposable between the foundation and the building structure;
at least one guidepost in communication with the building structure, the substructure and the foundation; and
a lifting system comprising a motor, at least one linear actuator, and at least two horizontal steel drive shafts connected to the at least one linear actuator, the lifting system extending between a first end and a second end, the first end being in communication with the substructure and the second end being in communication with the foundation so that actuating the lifting system applies a force to axially displace in a substantially up and down direction the substructure with the building structure along or with the at least one guidepost relative to the foundation,
wherein the substructure includes at least one collar coupled to the at least one guidepost such that the substructure is axially translatable along and relative to the at least one guidepost,
wherein as the at least two horizontal steel drive shafts rotate via actuation of the motor, the at least one linear actuator axially translates in a direction away from the foundation so as to exert an upward force on the substructure and building structure.

18. A liftable building system, comprising:
a building structure;
a foundation configured for supporting the building structure;
a substructure disposable between the foundation and the building structure;
at least one guidepost in communication with the building structure, the substructure and the foundation; and
a lifting system extending between a first end and a second end, the first end being in communication with the substructure and the second end being in communication with the foundation so that actuating the lifting system applies a force to axially displace in a substantially up and down direction the substructure with the building structure along or with the at least one guidepost relative to the foundation, the lifting system comprising:
a motor,
at least one linear actuator, and
at least two horizontal steel drive shafts connected to the at least one linear actuator,
wherein as the at least two horizontal steel drive shafts rotate via actuation of the motor, the at least one linear actuator axially translates in a direction away from the foundation so as to exert an upward force on the substructure and building structure.

19. The system of claim 18, wherein the lifting system further comprises a limit switch that limits the total axial displacement of the at least one linear actuator whereby limiting the total axial displacement of the substructure and the building structure.

* * * * *